United States Patent [19]
Modrak et al.

[11] 3,788,282
[45] Jan. 29, 1974

[54] VAPOR-LIQUID SEPARATOR

[75] Inventors: Thomas M. Modrak, Beloit; Robert W. Curtis, Alliance, both of Ohio

[73] Assignee: The Babcock & Wilcox Company, New York, N.Y.

[22] Filed: June 27, 1968

[21] Appl. No.: 740,614

[52] U.S. Cl............... 122/34, 122/491, 55/343, 55/347, 55/348, 55/349, 55/355, 55/396, 55/423, 55/426, 55/457, 55/459, 55/DIG. 23
[51] Int. Cl. ....................... B04c 5/26, B04c 5/28
[58] Field of Search ..... 55/343, 345, 423, 455, 456, 55/457, 459, 347, 348, 349, 355, 396, 426, DIG. 23; 122/34, 488, 491, 492

[56] References Cited
UNITED STATES PATENTS

| | | | |
|---|---|---|---|
| 190,100 | 4/1877 | Urie | 55/DIG. 20 UX |
| 530,023 | 11/1894 | De Rycke | 55/457 X |
| 2,112,321 | 3/1938 | Wood | 122/491 |
| 2,392,872 | 1/1946 | Wolfe | 55/345 |
| 2,518,459 | 8/1950 | Frisch | 122/491 X |
| 2,782,772 | 2/1957 | Blaser | 122/406 |
| 2,918,139 | 12/1959 | Silverman | 55/457 X |
| 3,370,408 | 2/1968 | Lehrer et al. | 55/429 |

FOREIGN PATENTS OR APPLICATIONS

| | | | |
|---|---|---|---|
| 386,215 | 4/1965 | Switzerland | 55/447 |
| 736,197 | 9/1932 | France | 55/457 |
| 1,252,017 | 9/1957 | France | 55/456 |

*Primary Examiner*—Dennis E. Talbert, Jr.
*Attorney, Agent, or Firm*—J. Maguire; Robert J. Edwards

[57] ABSTRACT

A primary vapor-liquid separator apparatus having two cyclonic stages of separation which operate in series to remove successive fractions of liquid from an inflowing vapor-liquid mixture. The first separating stage has a vertical, annular flow channel in which swirl vanes are installed to impart a whirling motion to the inflowing mixture to centrifugally separate therefrom the first fraction of liquid which is removed through a skimming slot opening within the flow channel wall. The second stage of separation is a tangential inlet cyclone mounted superjacent the first stage which allows the separated vapor to leave the second stage in an upwardly directed flow path coaxially aligned with that of the inflowing mixture to the first stage, while the separated liquid is discharged from the bottom of the cyclone into a collecting chamber from whence it passes to mix with the first separated liquid fraction within the water space of a steam generator.

5 Claims, 4 Drawing Figures

PATENTED JAN 29 1974 3,788,282

VAPOR-LIQUID SEPARATOR

BACKGROUND AND SUMMARY OF THE INVENTION

This invention relates in general to vapor-liquid separating equipment adapted for use in conjunction with heat exchangers and steam generators, and more particularly to an improved steam-water separator apparatus which is advantageous for use with natural circulation steam generators in that it has a relatively high steam-water separation capacity per unit volume of separator apparatus.

According to the invention, it has been found that a separator apparatus having two cyclonic separator stages integrally flow connected in series can achieve a significantly higher steam-water primary separation capacity for a given volume than was heretofore possible with known cyclone separators. The first stage serves to remove approximately 30 percent of the liquid content of an inflowing steam-water mixture, and the second stage removes substantially all of the remaining entrained liquid.

The first separator stage includes a vertically extending annular flow channel defined by a conduit that is coaxially disposed with respect to the superjacent second separator stage. The bottom end of this channel receives the inflowing steam-water mixture. A plurality of swirl vanes mounted within the annulus impart a whirling motion to the axially flowing mixture that centrifugally separates the first liquid fraction which then exits through a skimming slot opening in the conduit wall.

The second separator stage is an upright cylindrical cyclone type steam generator positioned superjacent the upper portion of the first stage flow chamber with tangential fluid inlets which receive the steam and residual water mixture deriving from the first stage of liquid extraction. These inlet means include one or more surfaces positioned to guide the entering steam-water mixture along a path generally tangential to the inside wall surface of the cyclone separator. The whirling cyclonic motion thus imparted to the mixture by reason of its tangential entry centrifugally separates the second liquid fraction which collects by gravity at the bottom of the cyclone and exits therefrom into a collecting chamber from whence it passes through hollow circuit members to mix with the first separated liquid fraction within the water space of a steam generator, while the steam exits from the top of the cyclone.

For the purpose of combining the separated liquid flows from the two stages into a common liquid return, a shroud is mounted exterior to the first stage annular flow channel, circumferentially surrounding and enclosing in radially spaced-apart relation the skimming slot and the outside open ends of the hollow circuit members associated with the second stage.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

DESCRIPTION OF THE PREFERRED EMBODIMENTS OF THE INVENTION

Figure 1:
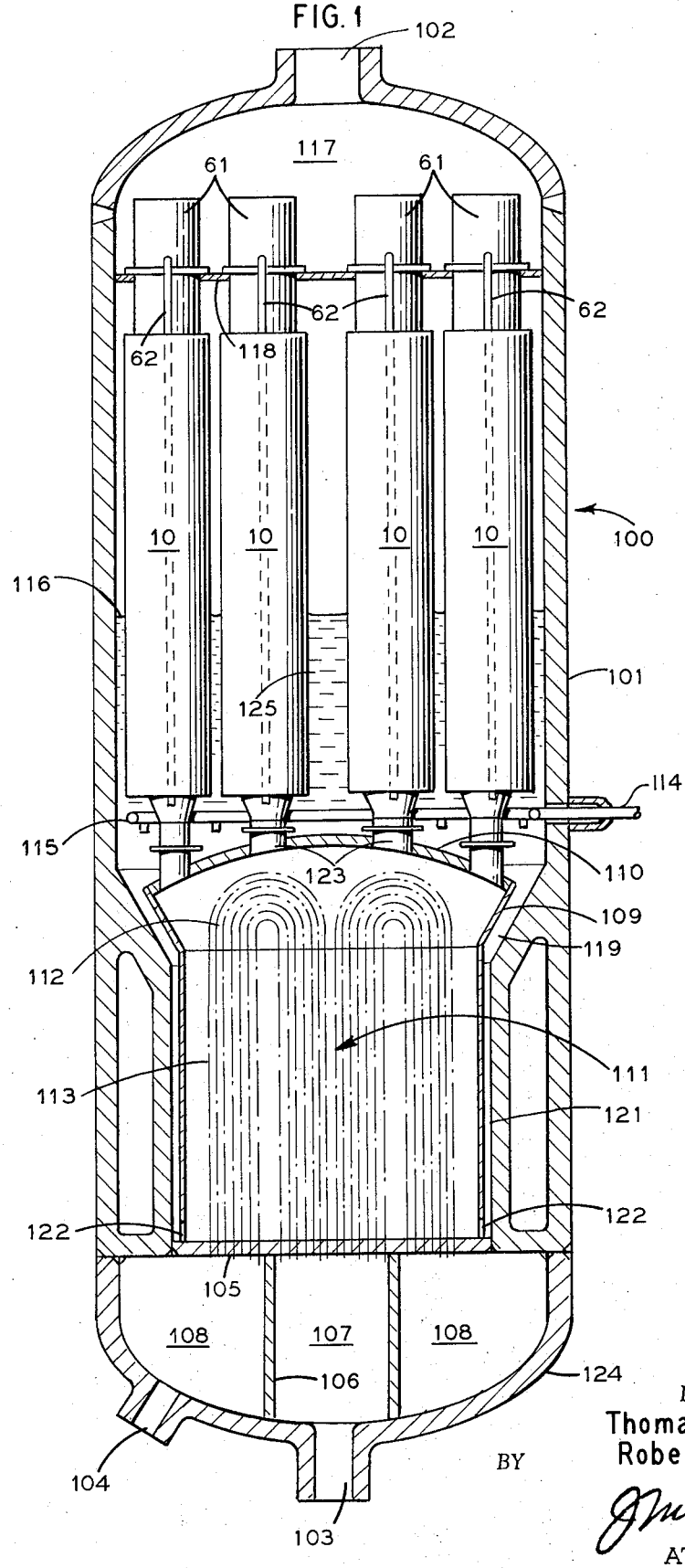
FIG. 1 is an elevation view, partly in section, of a steam generator incorporating a plurality of vapor-liquid separator units according to a preferred embodiment of the invention.

In FIG. 1 there is shown a steam generator 100 which comprises an upright pressure vessel 101 provided at its upper end with a steam outlet nozzle 102 and at its lower end with heating fluid inlet nozzle 103 and outlet nozzle 104 respectively. Within the lower portion of vessel 101 is a tube sheet 105 and a cylindrical sleeve 106 that defines with tube sheet 105 and the end closure 124 of vessel 101 heating fluid inlet chamber 107 and annular outlet chamber 108.

Within the vessel space above tube sheet 105 is a shroud 109 and a cover plate 110 which define an enclosed vapor generation chamber 111 in which a heat exchanger tube bundle 112 is situated. The individual tubes 113 in the bundle 112 are generally U-shaped and have one end opening through the central portion of tube sheet 105 into chamber 107, and the other end opening through the outer portion of tube sheet 105 into annular chamber 108.

Heating fluid, such as the primary coolant which exits from a nuclear reactor core (not shown), may with suitable piping (not shown) be passed to nozzle 103, circulated through the tubes 113 and returned to the reactor from nozzle 104 for recirculation through the core. In passing through tubes 113 the primary fluid vaporizes a secondary liquid, such as water, which is in contact with the outside surface of tubes 113, within vapor generation chamber 111.

By regulating the flow of feedwater admitted into vessel 101, through nozzle 114 and ring header 115 a water level 116 is maintained within the vessel 101.

Extending upwardly through a portion of the water space 125 below water level 116, and into the vapor space 117 thereabove, are a plurality of vapor-liquid separator units 10 which communicate with vapor generation chamber 111, via pipe connections 123 which extend through cover plate 110, to receive the vapor-liquid mixture generated within chamber 111. The separator units 10 are retained at their upper ends by a grid plate 118 secured to the wall of vessel 101, with the separated vapor being discharged into the vapor space 117 above plate 118 and the separated liquid being discharged into the water space 125 below water level 116.

The separated liquid, along with the feedwater introduced into vessel 101 via nozzle 114 is supplied to vapor generation chamber 111 by downward flow through an annular passage 119 defined by the spacing between shroud 109 and vessel wall section 121, and enters the chamber 111 through a plurality of openings 122 provided in shroud 109 about its circumferential line of contact with tube sheet 105.

Figure 2:
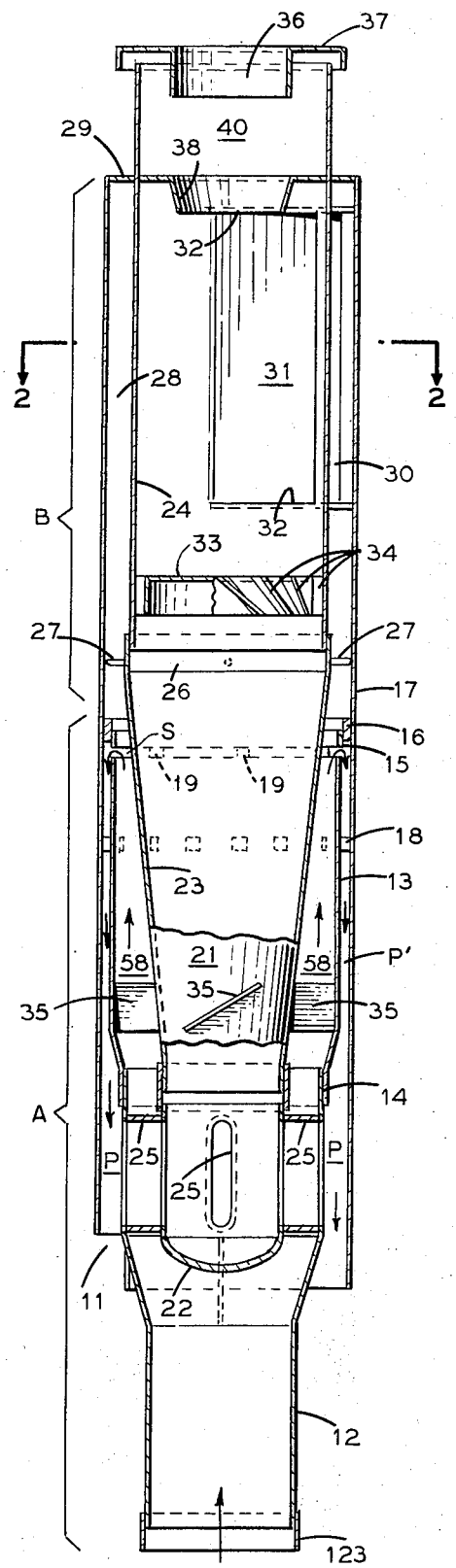
FIG. 2 is a sectional elevation view of a typical primary vapor-liquid separator unit shown in FIG. 1.
Figure 3:
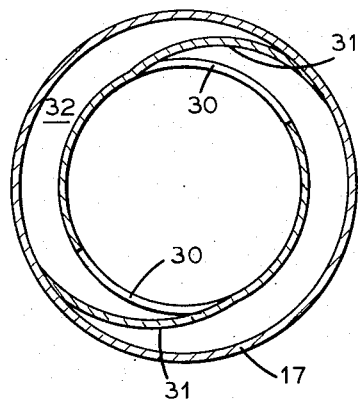
FIG. 3 is a sectional plan view of the separator unit of FIG. 2 taken along line 2—2.

Reference should be had to FIGS. 2 and 3 for further details as to the construction of the individual separator units 10, where it can be noted that a typical separator unit 10 can be regarded as basically comprising two cyclonic type separator stages i.e. first stage A and second stage B, flow connected in series to remove successive fractions of liquid content from that portion of the total steam-water mixture from chamber 111 which is received by the separator unit 10.

The essential function of stage A is to provide a conduit means for receiving and guiding the inflowing mixture upwardly past a set of swirl vanes extending into the flow path which impart a whirling motion to the mixture. Such conduit means must also provide a skimming slot, located above the swirl vanes, that allows the liquid thrown against the conduit wall to exit before the remaining mixture enters the second separator stage B. Approximately 30 percent of the liquid fraction is separated from the steam-water mixture by this centrifugal action.

These requirements are met in accordance with the invention by a first separator stage A that has a vertically extending conduit means 11 made up of a lower section 12 that is connected to a pipe 123 which is in direct communication with vapor generator chamber 111, an intermediate section 13 connected in tandem with section 12 by a slip joint arrangement 14, a first ring section 15, and a second ring section 16.

The foregoing elements, making up conduit means 11, are disposed in laterally surrounding coaxially spaced apart relation to a plenum chamber 21 that is associated with the second separator stage B and define with said plenum chamber 21 an annular passage 58.

A cylindrical shroud 17 surrounds both the second separator stage B and the major upper portion of first stage A in spaced-apart coaxial relation thereto. The upper portion of shroud 17 in combination with the outside surface of separator stage B defines an annular passage 28, closed at its upper end by a ring plate 29, and at the other end in open communication with passage 58. The lower portion of shroud 17 cooperates with the outside surface of intermediate section 13, to define an annular passage P which communicates with passage 58 by means of a circumferentially extending slot S, formed in conduit means 11 by the axial spacing existing between the upper end of section 13 and the lower face of ring 15.

Shroud 17 is necessarily larger in inside diameter than section 13 is in outside diameter and is connected to section 13 by a plurality of circumferentially spaced-apart bars 18 that are welded to the outside of section 13 and plug welded to shroud 17 so as to support same in coaxial relation to section 13. Ring section 16 has an outside diameter substantially equal to the inside diameter of shroud 17 and is welded thereto along its circumference to provide support for ring section 15 which is welded along its circumference to the inside of ring section 16. Section 13 has substantially the same diameter and wall thickness as ring section 15 and is positioned in endwise, axially spaced-apart relation thereto so that in effect, ring section 15 and the section 13 define a conduit means 11 length portion P' of approximately uniform cross section.

Expediently, a plurality of circumferentially spaced-apart bars 19 are welded to section 13 and ring section 15 to maintain the desired width of slot S.

In the annular passage 58, there are provided a plurality of circumferentially spaced-apart, radially extending, inclined swirl vanes 35 secured to the inside wall surface of section 13, and to the outside surface of plenum chamber 21.

During operation of the separator unit 10, these vanes 35 serve to impart a whirling motion to the steam-water mixture flowing through passage 58. Thus, while the mixture will have substantially only an axial flow velocity component along that portion of its flow path extending from the bottom end of section 12 up to approximately the location of the vanes 35, in the portion of passage 58 above the vanes 35, the mixture will follow a helical flow path, with both axial and rotational velocity components. It is the rotational velocity component which causes the initial liquid fraction to be centrifugally separated from the steam-water mixture and thrown against the inside wall surface of section 13, and sweeps the separated liquid upward along the wall surface to exit through the circumferential skimming slot S. The first liquid fraction thereafter flows downwardly through the shrouded annular passage P'–P and exits therefrom into the water space 125 of heat exchanger 100 through the opening at the lower end of passage P. The residual mixture, with initial liquid fraction separated therefrom, flows upwardly into passage 28 to enter separator stage B.

The second separator stage B is actually a cylindrical cyclone separator 24 from which depends the plenum chamber 21 that serves to collect and discharge the liquid fraction separated from the steam-water mixture within the second separation stage B. Plenum chamber 21 is made up of a tapered section 23 and mating lower end section 22.

Lower end section 22 of plenum 21 is connected to section 12 by means of four radially extending tubular members 25 spaced circumferentially 90° apart and which serve to support the end section 22 within section 12 in generally coaxial relation thereto. Tubes 25 penetrate the walls of both end section 22 and section 12 to place the inside of plenum chamber 21 in communication with annular passage P.

To maintain both the upper portion of plenum chamber 21 and the lower portion of cyclone separator 24 in coaxial relation to shroud 17, a ring 26 with circumferentially spaced, radially extending pins 27 is mounted on the upper end of the tapered section 23, these pins 27 being of a length to provide engagement with the inside wall surface of shroud 17.

Cyclone separator 24 communicates with passage 28 via a pair of diametrically opposed inlet openings 30 which introduce the steam water mixture flowing in passage 28 substantially tangentially into separator 24, and for such purpose the openings 30 are provided with associated curved guide plates 31 and crescent-like top and bottom end plates 32 which are secured to separator 24 and shroud 17 preferably by welding.

The whirling motion associated with tangential introduction of the steam-water mixture causes substantially all of the residual liquid to be centrifugally separated from the steam, with the steam passing upwardly through the outlet 36 into vapor space 117 of FIG. 1.

Within separator 24 there is provided an inverted U-shaped baffle 33 supported by a plurality of circumferentially spaced-apart inclined vanes 34, fitted and secured within the annular space formed by baffle 33 and the wall of separator 24. The baffle 33 effectively promotes separation of the steam and water, with the inclined vanes 34 serving to direct the separated water swirling downwardly into plenum 21.

The steam separated from the mixture introduced into separator 24 exits therefrom along an axial flow path through a re-entrant sleeve outlet 38 into plenum 40 where further separation of entrained moisture from the steam takes place. Here again to prevent re-entrainment of the separated liquid in the outflowing steam, and also to further improve the second stage separation efficiency, a reentrant sleeve is provided around outlet 36. The steam leaving outlet 36 enters the vapor space 117 in FIG. 1 from whence it goes to the point of use via nozzle 102. The separated water is discharged around the outer periphery of the top cover plate 37.

If desired, an even further reduction in the small amount of residual water remaining in the steam leaving the primary separators 10 can be effected by passing their effluent through secondary separators 61. These separators 61 are constructed as disclosed in U. S. Pat. No. 3,324,634 issued to M. A. Brahler et al. The steam upon leaving the separators 61 passes through nozzles 102 to the point of use. Drains 62 are provided for carrying away moisture removed by the action of separator 61.

Figure 4:
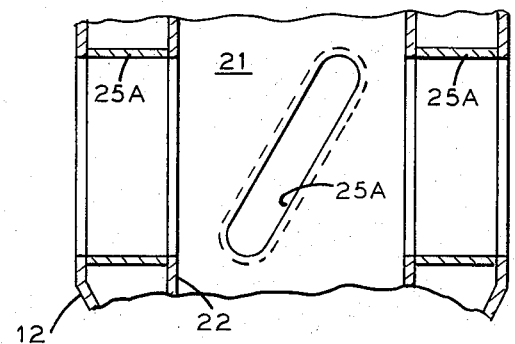
FIG. 4 is a partial sectional elevation view of a separator unit similar to that shown in FIG. 2, but constructed in accordance with another embodiment of the invention.

In some instances it may be desirable to eliminate the swirl vanes 35 in FIG. 2 and in their stead relocate the tubes 25 inclined in a manner similar to that of vanes 35. FIG. 4 shows this modification for producing a swirling motion in the steam-water mixture entering annular passage 58. In FIG. 4. the inclined flattened hollow tubes 25A serve generally the same functions as the combination of hollow tubes 25 and swirl vanes 35 in FIG. 2.

The separator unit 10 can in general be used for the separation of vapor-liquid mixtures other than steam-water mixtures. As illustrated it is ideally suited for a steam generator unit arranged with bottom inlet axial flow of steam and water.

As a general guide the flow passages are designed to handle a steam flow of approximately 20,000 pounds per hour per square foot of cross sectional flow area, and the opening width of the slot S is made approximately one-quarter inch.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. The combination of a vapor generator comprising a pressure vessel, means defining a liquid and a vapor space within said vessel, and a vapor-liquid separator apparatus disposed within said vessel and communicating with said spaces and comprising a first cyclone separator means including a vertically extending conduit means disposed to receive at one end an inflowing vapor-liquid mixture, swirl vane means disposed within the conduit means for reaction with the flow of said mixture therethrough to impart a whirling motion to the mixture to centrifugally separate a first fraction of the liquid content thereof for collection along the inside wall surface of the conduit means, and means defining a substantially circumferentially extending aperture formed through the wall of the conduit means to accommodate the exit therefrom of said separated first liquid fraction, and a second cyclone separator means flow connected in series with the first cyclone separator means and including an upright cylindrical cyclone separator disposed in superjacent relation to the first cyclone separator means and having a tangential inlet to receive therefrom a refined vapor-liquid mixture resulting from the removal of said first liquid fraction, the second cyclone separator means being operable to remove from said refined mixture a second and further fraction of the liquid content thereof and having outlet means discharging into the vapor space and positioned to accommodate the exit of separated vapor from said refined mixture along a flow path positioned in axial alignment with that of the inflowing vapor-liquid mixture to the first cyclone separator means, said outlet means having vertically spaced first and second levels and including a separate re-entrant sleeve member associated with each of the levels, a pan-shaped member concentrically disposed within the second cyclone separator below the inlet thereof and radially spaced from the inner periphery of said second cyclone separator to form an annular passageway therebetween, and swirl vane means disposed within said annular passageway, a plenum chamber connected to said second cyclone separator to receive therefrom the liquid separated thereby from said refined mixture, said plenum chamber extending downwardly into said conduit means to define therewith an annular flow passage for the vapor-liquid mixture flowing through said first cyclone separator means, and means defining an enclosed passage extending through the wall of said conduit means and communicating with the interior of said plenum chamber to accommodate the exit therefrom of said separated second liquid fraction.

2. A combination according to claim 1 including a conduit disposed in surrounding spaced-apart relation to the conduit means of said first cyclone separator means to define therewith a shrouded annular passage communicating with said aperture in the wall of said conduit means, and communicating with said enclosed passage to combine said first and second separated liquid fractions for discharge into said liquid space.

3. A combination according to claim 1 wherein the means defining said second liquid fraction exit passage includes a plurality of hollow members connected to said plenum chamber and connected to the wall of said conduit means to support said plenum chamber in radially spaced-apart relation to the inside surface of said conduit means wall.

4. A combination according to claim 1 wherein said swirl vane means includes a plurality of radially extending vanes connected to said plenum chamber for support thereby.

5. A combination according to claim 1 wherein said swirl vane means includes a plurality or radially extending vanes connected to the wall of said conduit for support thereby.

* * * * *